(12) United States Patent
Keeley

(10) Patent No.: US 6,529,785 B1
(45) Date of Patent: Mar. 4, 2003

(54) JOG CONTROL FOR INDUSTRIAL CONTROL NETWORK

(75) Inventor: Thomas M. Keeley, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/407,186

(22) Filed: Sep. 27, 1999

(51) Int. Cl.[7] .............................................. G05B 15/00
(52) U.S. Cl. ......................... 700/83; 700/245; 318/443
(58) Field of Search ................................ 700/245, 248, 700/254, 264, 83; 318/443

(56) References Cited

U.S. PATENT DOCUMENTS

| | | | | |
|---|---|---|---|---|
| 5,453,674 A | * | 9/1995 | Masaki et al. | 318/573 |
| 5,608,618 A | * | 3/1997 | Kosaka et al. | 700/61 |
| 5,980,082 A | * | 11/1999 | Watanabe et al. | 700/86 |
| RE36,631 E | * | 3/2000 | Tanabe et al. | 318/568.13 |
| 6,088,628 A | * | 7/2000 | Watanabe et al. | 700/264 |
| 6,163,129 A | * | 12/2000 | Younger et al. | 318/799 |
| 6,324,443 B1 | * | 11/2001 | Kurakake et al. | 700/245 |

* cited by examiner

*Primary Examiner*—Thomas Black
*Assistant Examiner*—Ronald D Hartman, Jr.
(74) *Attorney, Agent, or Firm*—Steven J. Wietrzny; Alexander M. Gerasimow; William R. Walbrun

(57) ABSTRACT

The method and system for an industrial control system network jog control of the present invention provides responsive jogging of a machine for a consistent, fixed duration that minimizes the effects of network and processor delays. A jog message is input at a human machine interface by an operator directly observing the operation the machine. The jog message includes an address indicator corresponding to a network location of the controlled equipment and a jog duration period. The jog message is sent along the network directly to an output device attached to the controlled equipment. A jog pulse is then transmitted for the proper duration by the output device. Clock circuitry within the output device is used to limit the jog pulse to the jog pulse duration period of the jog message.

18 Claims, 4 Drawing Sheets

JOG CONTROL FOR INDUSTRIAL CONTROL NETWORK

CROSS REFERENCE TO RELATED APPLICATIONS

STATEMENT REGARDING FEDERALLY SPONSORED RESEARCH OR DEVELOPMENT

BACKGROUND OF THE INVENTION

This invention relates to industrial control systems for controlling the operation of machinery, such as motors and actuators, and in particular to a method and system for providing a responsive and consistent jogging of a controlled machine in an industrial control network.

An industrial control system may include a central industrial controller connected via a communications network to one or more spatially remote input-output (I/O) devices in turn connected to the controlled machinery. Industrial controllers are special-purpose computers processing input data received from sensors on the controlled machinery or from operators, to produce output data transmitted to the controlled machinery. The communications networks relay this data to and from the industrial controller. Communications networks used for this purpose include the well-known protocols of Ethernet, DeviceNet, ControlNet, Fire Wire and Field Bus. The I/O devices provide an interface between the network signals and the control machines.

Often, the operator of a machine controlled by such a system needs to jog or incrementally advance the machine. This is common in robotics or motion control systems where the operators must make slight position adjustments to perform a specific task. Under conventional practice, in order to jog a machine, the operator presses a button on a control panel such as a human/machine interface (HMI) to create a "machine start" message. This message is sent through the network to the industrial controller. The industrial controller processes the machine start message with the control program (which may for example, ensure that the machine is not in a "stop mode" in which jogging is prohibited) then transmits the message again through the network to an I/O device. The I/O device converts the message to electrical signals compatible with the machine and the machine is activated. Then, when the operator releases the button, a "stop message" is sent via the same or similar path to deactivate the machine. The operator viewing the machine and the dynamics of the jogging operation may make very fine and accurate adjustments so long as the amount of jogging is consistent from jog to jog. Unfortunately this is not always the case.

As mentioned the jog commands may be received by the industrial control system through one or more human/machine interfaces (HMI's) which may employ a matrix of membrane or other switches having predefined designations. It is normal to read such switches in a scanning process that scans through the switches, thereby reducing the amount of wiring needed to connect the switches to internal control circuitry. The speed of this scanning may be relatively slow and thereby may introduce an unpredictable delay in the generation of a switch signal depending on when during this scan the switch is pressed.

Once the jog signal is created, it must be transmitted over the network. In order that the communication of data is timely and predictable, most industrial control networks include a protocol in which the data is assigned to specific network slots, a network slot being a predefined time interval during which communication occurs on the network. Input and output data is queued until the network slots at the scheduled time are available. This queuing introduces a bounded but unpredictable delay in the transmission of the data depending on the amount of message traffic and the priority of the message. In order to reduce this delay, time critical messages may be assigned a high priority on the network, where high priority messages obtain use of the shared communication media in preference to low priority messages. Normally, however, even high priority message experience some delay both because of the competition between high priority messages and because the proportion of message carrying capacity of the communications network allocated to high priority messages is limited to ensure that low priority messages will also be guaranteed transmission.

The data received by the industrial controller is processed during a cycling "scan" of a stored control program during which the industrial controller examines received inputs reflecting the status of the controlled process and changes the series of outputs that will ultimately be transmitted on the network to control the industrial process. Depending on when the data is received with respect to the scanning of the control program, a bounded but unpredictable delay will occur before the data is processed by the control program.

Additionally, individual components of the control system operate asynchronously in relation to each other. This exacerbates the aforementioned delay problem and the machine will not be activated immediately. This delay can result in the operator inputting multiple signals, believing that the machine did not respond to the initial input or being frustrated as the machine moves slowly up on the target then jumps beyond it as a result of inconsistent jogging action.

SUMMARY OF THE INVENTION

The present invention provides a method and system for jogging equipment controlled by the industrial control network that overcomes the problems of the prior art. In particular, the present invention provides consistent jogs by processing special jog messages defining fixed-length jog pulses at the controlled equipment. Also, the present invention minimizes network delay effecting the jog by processing the jog message at the controlled equipment drive unit.

Specifically, the method and system of the present invention include an industrial control system for controlling the operation of a machine having a communications network connecting a jog button to at least one output device, which may be separate from or incorporated into the machine. The communications network introduces a variable delay in the transmission of messages. In response to a pressing of a jog button by a human operator who is observing the operation of the machine, a predefined jog message is transmitting on the network. The jog message includes a jog duration period and an address corresponding to the machine. The jog message is received at the output device corresponding to the machine, which reads the message and turns on the corresponding machine, waits for the jog duration period to expire and then turns off the machine. The time the machine is turned on is the same as the jog duration period, despite the delay introduced by the communications network.

The present invention thus provides the object and advantage of allowing practical jogging of machines on a network-based control system. The invention provides responsive jogging much like direct wired control systems, but at the lower installation cost and simplicity of a network system.

Reducing the time delay from when the jog button is depressed to the start of the jog gives the operator a more intuitive feeling of control. Similarly, eliminating the variation in jog length improves the accuracy of positioning and advancement the machine.

Another aspect of the invention is that the industrial control system includes a centralized industrial controller executing a control program and communicating with the communications network to send and receive messages thereon in accordance with the control program. Alternatively, the industrial control system may include multiple distributed industrial controllers executing portions of a control program and communicating with the communications network to send and receive messages thereon in accordance with their portions of the control program.

The present invention provides another object and advantage in that is operable in central and distributed control systems. The specialized jog messaging of the present invention allows selective bypassing of the controller so that the controller may be bypassed for jog functions but utilized for other functions.

Yet another aspect of the invention is that the jog button may be a common mechanical, capacitive or photoelectric switch. Or, the jog button may be a part of a human-machine interface having a plurality of buttons scanned in sequence. In each case, the jog duration may be pre-selected by the operator.

The present invention thus provides another object and advantage by allowing responsive and accurate jogging of a network machine with switches such as membrane and capacitive switches having relatively slow response times.

Still another aspect of the present invention is that the jog message may be received at a industrial controller after being transmitted on the network, in which case the industrial controller executes a stored program to read the jog message at a periodic scan. The industrial controller analyzes the state of the network to determine whether the machine at the network address should be jogged. If so, the jog message is transmitted on the network to the output device corresponding to the machine at the network address of the jog message.

The present invention provides the further object and advantage of allowing a control program executed by an industrial controller to supervise whether jogging can occur.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 3 is a tabular representation of the parameters of the jog signal recognized by and stored in the memory of the machine I/O;

DETAILED DESCRIPTION OF THE PREFERRED EMBODIMENTS

Figure 1:
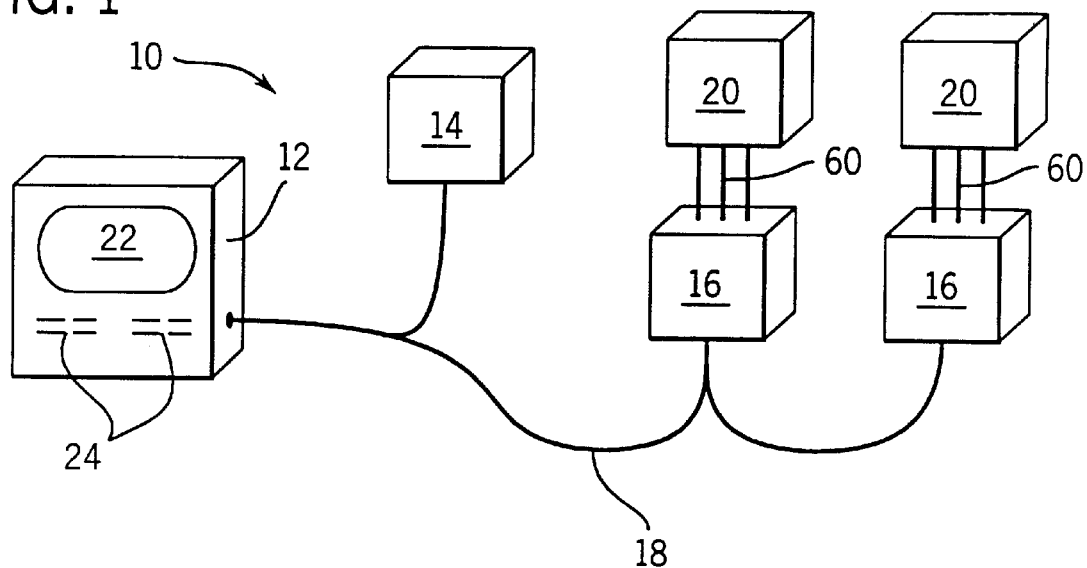
FIG. 1 is a perspective view of an industrial control system having a user interface, a industrial controller, input/output modules and machines.

Referring now to FIG. 1, an industrial control system 10 suitable for use with the present invention includes as primary components an operator interface 12, an industrial controller 14 and input/output (I/O) modules 16 all interconnected by a communications network 18 to control the operation of controlled equipment 20 according to control programs stored in the industrial controller 14 as well as data exchanged with the other controllers (not shown) as is understood in the art.

The system can be a centrally controlled system, such as that shown in FIG. 1, having a industrial controller 14, such as a programmable logic controller (PLC) as known in the art. Alternatively, the present invention can operate in a distributed control system, as known in the art and not shown, having multiple controllers locally controlling machines according to their respective portion of a stored program.

Figure 2:
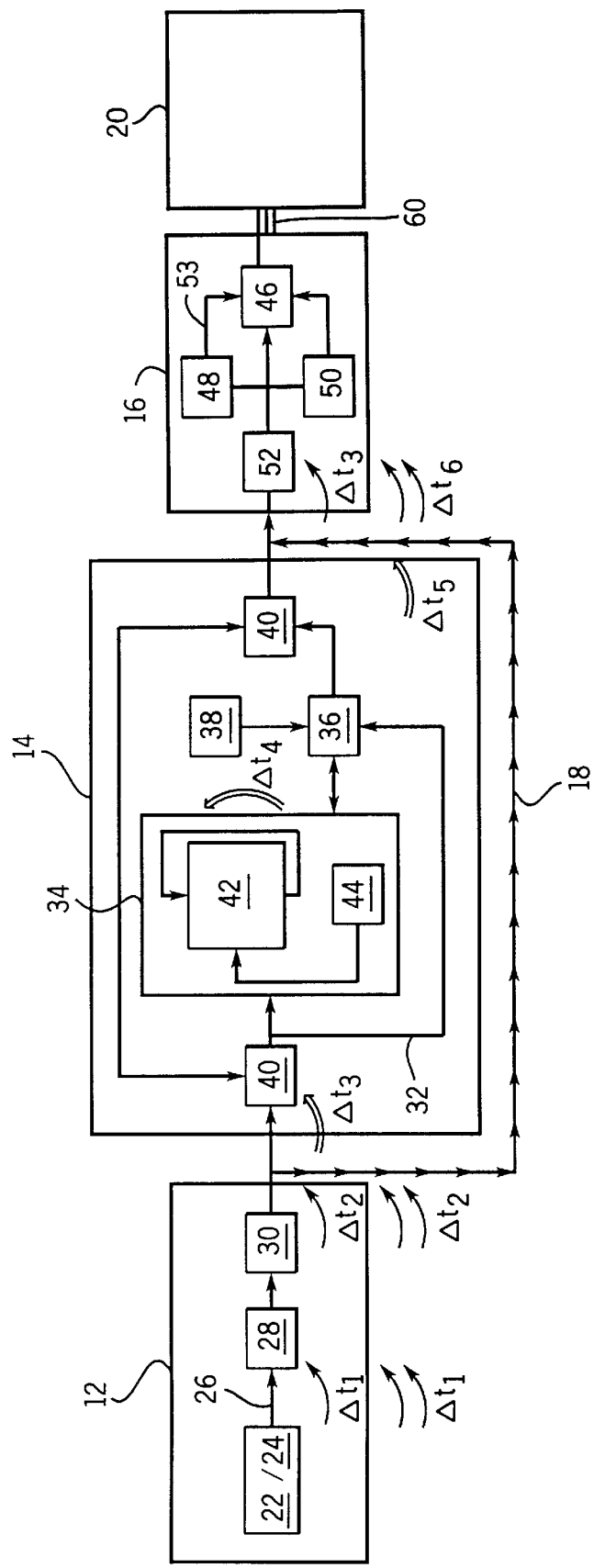
FIG. 2 is a block diagram of the industrial control system of FIG. 1 configured according to the present invention and showing the time duration of the various processes executed from the operator input to sending the jog message to the machines.

Referring to FIG. 2, the operator interface 12 can be any suitable switch, such as a mechanical, capacitive or photoelectric switch. Preferably, the operator interface 12 is a human-machine interface (HMI), having a touch-sensitive membrane display 22 and a keypad 24, as shown in FIG. 1. The operator interface 12 includes an internal bus 26 connecting the display 22 and keypad 24 to a suitable processor 28 and network interface 30, as known in the art. The processor 28 communicates over the internal bus 30 with the touch screen 22 and the keypad 24 for processing the operator input. As is known in the art, the keypad 24 may perform a variety of functions as determined by internal programming. The processor 28 scans each keypad location periodically for closure and then correlates this signal to the appropriate functional output signal. For the present invention, the keypad can be used to invoke jog functions of any number of predefined jog lengths.

The network interface 30 may contain or communicate with memory buffering output signals waiting to be transmitted across the network 18, which is comprised of optical or electrical cabling as known in the art. The network interface 30 is typically an application specific integrated circuit (ASIC) providing the protocols necessary for communication between the devices on the network 18. Such protocols may include asynchronous protocols such as Ethernet and isochronous protocols such as ControlNet, Field Bus and Fire Wire as well as other protocols well known in the art.

In an isochronous network as described herein, the network protocol ensures that the communication of data is timely and predictable by assigning data signals to specific network slots, a network slot being a predefined time interval during which communication occurs on the network.

Input and output data is queued until the network slots at the scheduled time are available. This queuing introduces a bounded but unpredictable delay in the transmission of the data depending on the amount of message traffic and the priority assigned to the message.

As mentioned above, the present invention can also operate in an industrial control system having one or more industrial controllers 14. In the preferred embodiment, the industrial controller 14 is a PLC, which may be programmed to allow users to control a wide variety of systems and perform a great number of operations.

Referring still to FIG. 2, the industrial controller 14 includes an internal bus 32 connecting a suitable memory 34, processor 36, clock circuit 38 and network interface 40, as are known in the art. As in the operator interface 12, the network interface 40 provides the necessary network protocols for communication on the network 18. The memory 34 stores a logic table 42 and an input/output table (I/O) 44. The logic table 42 includes logic instructions as known in the art which the processor 36 analyzes at periodic scans according to input signals received over the network 18 and stored in the I/O table 44. The processor 36 performs a scan of the logic table 44 according to a predetermined priority and queue sequence. The input signals are stored in the I/O table 44 at arbitrary times, independent of the scans of the logic table 44. Thus, an input signal received after the corresponding logic expression in the logic table 44 has been scanned will not be scanned until the following scan. Even then, if the signal is of lower priority than later received signals, it may not be processed until after the higher priority signals are received.

In any event, output signals are generated by the processor 36 and buffered in the input/output table 44 until they are transmitted to the network 18 via the internal bus 32 and network interface 40. The processor 36 utilizes the clock circuit 38, which provides a continuous and/or on-demand system timer, as needed to perform timed functions.

Referring still to FIG. 2, like the industrial controller 14, the I/O module 16 includes a processor 46, a clock circuit 48, memory 50 and a network interface 52, similar to that previously described, interconnected by an internal bus 53. The network interface 52 operates to receive network transmitted signals directed to the I/O module 16. The memory 50 of the I/O module holds a stored control program for executing instructions to control the equipment 20. Rather than a true input-output device, the present invention can operate with the I/O module 16 being solely an output device having only output signal transmitting circuitry.

Referring briefly to FIG. 3, the memory 50 includes a jog message recognition database 51 containing all possible jog messages 54 and parameters pertaining to the network address of the corresponding controlled equipment 20. For each jog message 54, a corresponding network address 56 and jog duration period 58 is assigned and stored in the database 51. The jog messages 54 represented in FIG. 3 as Jog1 to JogN correspond to various display 22 and keypad 24 locations, which allow jogging of the controlled equipment 20 for various predefined time periods. Referring again to FIG. 2, the processor 46 communicates with the memory 50 and the clock circuit 48 as needed to operate and jog the controlled equipment 20 as needed according to a received jog message 54.

Each controlled equipment 20 has one or more corresponding I/O modules 16 which communicate machine control data to the controlled equipment 20 across dedicated input/output (I/O) lines 60. The controlled equipment 20 is any mechanical system, such as a motor, robot or fabricating machine, for performing an industrial process. The figures depict a system in which the I/O module(s) 16 are external to the controlled equipment 20, however, it is also within the scope of the invention for the controlled equipment 20 to include an on-board I/O.

Figure 4:
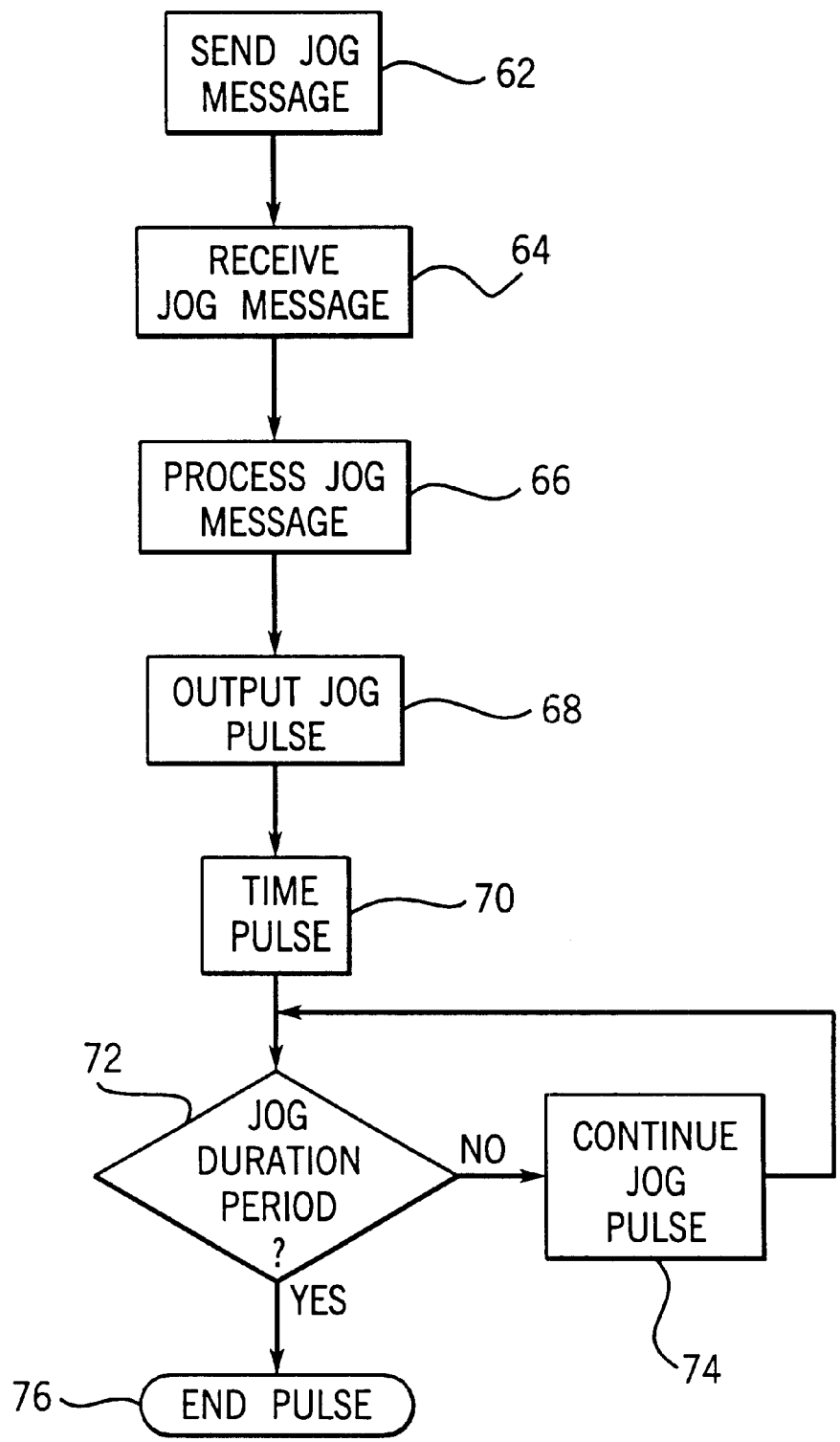
FIG. 4 is a flow chart showing the method of jogging a mechanical system in an industrial control system according to the present invention.

Referring to FIG. 4, at process block 62, when the display 22 or keypad 24 is depressed by an operator the processor 28 of the operator interface 12 sends a corresponding jog message 54 to the network interface 30 over the internal bus 30. The network interface 30 then buffers the jog message 54 until a virtual network communication slot is available to transmit the message onto the network 18.

In the preferred embodiment of the present invention, the industrial controller 14 is bypassed for all jog messages to significantly improve the responsiveness of the control and allow the operator to more accurately jog the controlled equipment 20. Instead, the jog message is sent across the network 18 directly to the I/O module controlling the controlled equipment 20, as indicated by process block 64. In this embodiment, operator inputs other than jogging may be received at the operator interface 12, processed and then sent through the network 18 to the PLC 14 for processing and further transmission. Once the jog message 54 is received at the network interface 52 of the I/O module 16, it is communicated to the processor 46 via the internal bus 53.

Still referring to FIG. 4, as indicated by block 66, the jog message 54 is processed by the processor 46 according to the stored parameters. At process block 68, the processor 46 sends a jog pulse in a suitable machine control language along the internal bus 53 to the I/O lines 60, which begins jogging the control equipment 20. Simultaneously, at process block 70, the processor 46 marks the time input from the clock circuit 48. Then, the processor 46 checks whether the elapsed time reached the value of the jog duration period 58 stored in memory for the given jog message 54, indicated by decision block 72. If not, at block 74, the processor 46 continues to output the jog pulse to the controlled equipment 20 until the jog duration has expired, at which point the pulse is terminated, at block 76.

By bypassing the industrial controller 14 and sending the jog message 54 directly to the I/O module 16 of the controlled equipment 20, the system 10 provides practical jogging of the controlled equipment 20 on a network-based control system. The system 10 of the present invention significantly reduces the time delay from when the jog button is depressed to the start of the jog, which gives the operator a more intuitive feeling of control. Similarly, providing a jog message 54 corresponding to a predefined jog duration period eliminates variation in jog length and greatly improves the accuracy of incrementally positioning the controlled equipment 20.

Prior art network industrial control systems would typically process and control jog functioning at the industrial controller. Thus, as described above, the jog message 54 would be received at the I/O table 44 of the industrial controller 14 at an arbitrary, and probably asynchronous, time in relation to the scan of the logic table 42 stored in memory 34. If the receipt of the jog message 54 occurred after the processor 36 scanned the corresponding logic expression in the logic table 42, the jog message 54 not be detected until the next scan, and jogging of the controlled equipment 20 would be delayed. Also, when the processor 36 does in fact detect and process the jog message 54 it then relays an output signal to the I/O module 16 of the controlled equipment 20. Because the output signal must be resent across the network 18, the jogging will encounter additional buffering delays. Moreover, because prior art systems typically do not transmit and process a fixed-length jog message as in the present invention, the operator must input a stop jog signal, either by depressing a stop button or by releasing the jog button. In this case, the delay is present in both the start and stop portions of the jog signal, which causes inconsistent jog lengths.

Referring again to FIG. 2, the curved double arrows indicate segments of the prior art control system at which significant system delays may be realized in the prior art system. $\Delta t_1$ represents the time elapsed from the point in which the operator depresses the button to when it is detected by the processor 28 in the operator interface 12. $\Delta t_2$ represents the time the jog message 54 is queued and awaiting an open network slot. $\Delta t_3$ is the time required to leave the network and be received by the industrial controller 14. $\Delta t_4$ represents the time the jog message 54 is in the I/O table 44 awaiting scanning of the logic table 42 in memory 46. As mentioned, this can vary significantly depending upon the synchronization of receiving the jog message 54 and the scan cycle. $\Delta t_5$ is the output queue buffering time and $\Delta t_6$ is the time for sending the jog pulse to the controlled equipment.

Figure 5A:
FIG. 5A represents an ideal jog pulse beginning immediately and ending immediately upon operator input and lasting for a prescribed time.
Figure 5B:
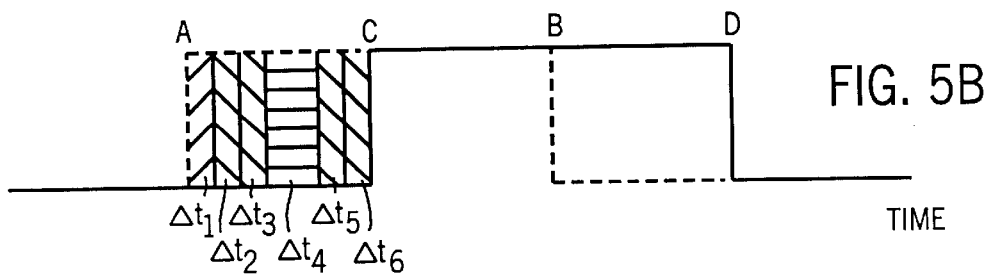
FIG. 5B represents a jog pulse beginning after network delays and lasting for the prescribed time, the ideal jog pulse of FIG. 5A shown in phantom.
Figure 5C:
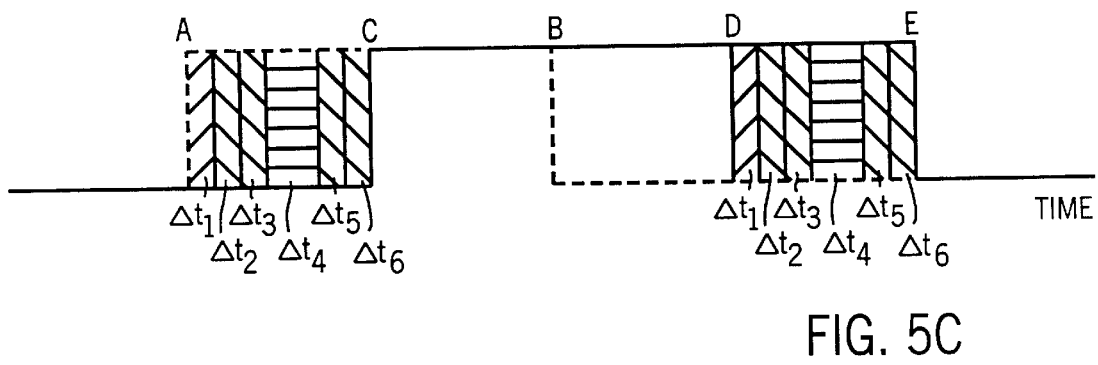
FIG. 5C represents a jog pulse beginning and ending after network delays and lasting for a longer duration than the prescribed time, the ideal jog pulse of FIG. 5A shown in phantom.

Referring to FIGS. 5A–5C, the graph of FIG. 5A illustrates an ideal jog pulse of a desired duration in which the jog begins immediately upon input by an operator at point A and ends when the input is terminated or the button is released at point B. Referring to FIG. 5B, the stack-up of system delays $\Delta t_1$–$\Delta t_6$ of the prior art system described above delays the beginning of the jog until point C. Assuming the pulse is terminated immediately upon releasing the input button or depressing a stop jog button, at point D, the jog will be of the desired duration. However, as shown in FIG. 5C, if the system delays slow down the receipt of the jog stop signal or release of the button, then the delays will cause the jog to continue beyond the desired duration to point E. Thus, in such systems delays may not only be significant to cause an unnatural feeling or lack of control by the operator, but may also cause jogs of inconsistent or unintended duration, which can make accurate positioning of the controlled equipment difficult, if not impossible.

In the system of the present invention, a situation like that shown in the FIG. 5C is not possible due to the fixed-length jog pulse. Moreover, as mentioned, the system of the present invention has significantly reduced the network interface and scan bottlenecks associated with network industrial control systems.

In the system according to the present invention, because the I/O module 16 is dedicated to a particular controlled equipment 20, when its processor 46 receives the jog message 54 it can act nearly instantaneously to process the message 54 and output a jog pulse. Unlike the industrial controller 14, the I/O processor 46 does not have to scan logic tables and process the logic instructions. Moreover, the jog pulse is sent over dedicated I/O lines 60, rather than the network 18. Thus, the present invention eliminates the logic processing delays and buffering delays for network transmission from the PLC 14, so that it realizes only the delays from receiving the operator input and enter and exiting the network, as indicated by the single curved arrows of FIG. 2 and represented by $\Delta t_1$–$\Delta t_3$.

In alternate embodiment of the present invention, the jog message 54 having the network address 56 and jog duration period 58 parameters could be transmitted and processed by the industrial controller 14. In this embodiment the system is identical to the that described above, however, the jog signal is received by the industrial controller 14 and read. The industrial controller 14 analyzes the I/O table 44 according to a stored program to determine whether, at the current state of the network, the controlled equipment 20 at the network address 58 of the jog message 54 can be jogged. If so, the jog message is transmitted on the network to the I/O module 16 corresponding to the controlled equipment. The duration of the jog pulse may be controlled by the industrial controller 14 or the I/O module 16 according to the respective clock circuit 38, 48.

Alternately, instead of processing a transmitted jog message, the industrial controller 14 could send a "no jog machine X" signal to the operator interface 12. In this way, a corresponding jog message cannot be transmitted onto the network 18 and adding to network traffic. A suitable notice could be displayed or a tone sounded at the operator interface 12 when the operator presses a jog button corresponding to the controlled equipment 20 that cannot be jogged.

In either of the alternate embodiments, the industrial controller 14 is used to determine whether the network is in a state in which it is safe to jog the controlled equipment. For example, the system will prevent an operator from jogging the controlled equipment 20 if it is currently performing certain high priority functions or if jogging the machine could cause damage to other equipment or operators. Also, in either of these alternate embodiments, the I/O module 16 must include input signal circuitry so that the industrial controller 14 can monitor the controlled equipment 20.

In these embodiments, when a jog message can be sent to the controlled equipment 20 the network delays mentioned above with regard to the prior art system remain present. However, because the system carries and process jog messages 54 having a predefined duration no separate jog stop signal is needed and the delays do not affect the duration of the jog pulse. Accordingly, the alternate embodiment of the present invention provides consistent jogging of the controlled equipment 20 across the network 18, allowing accurate positioning and advancement.

While the foregoing specification illustrates and describes the preferred embodiments of this invention, it is to be understood that the invention is not limited to the precise construction herein disclosed. The invention can be embodied in other specific forms without departing from the spirit or essential attributes. For example, in the above description the output circuitry in the I/O module 16 is used to interpret the jog message according to a jog message database 51 stored in memory onboard the I/O module 16 and operate the controlled equipment 20 for the prescribed time. The invention is not limited in this regard, however, as the jog duration control function of the I/O module 16 may be performed at the operator interface 12. In this case, the operator interface 12 includes suitable clock circuitry and jog message storage memory.

Accordingly, reference should be made to the following claims, rather than to the foregoing specification, as indicating the scope of the invention.

I claim:

1. In an industrial control system for controlling the operation of a machine, the industrial control system having a communications network connecting a jog button to at least one output device, the communications network introducing a variable delay in the transmission of messages, a method for jogging a machine attached to an output device, comprising the steps of:

(a) in response to a pressing of a jog button by a human operator who is observing the operation of the machine, transmitting a predefined jog message on the network, the jog message including a jog duration period defining the beginning and ending of jogging the machine and an address corresponding to the machine;

(b) receiving the jog message at the output device corresponding to the machine;

(c) at the output device, reading the message to:
  (i) turn on the machine corresponding to the address for a period equal to the jog duration period;
  (ii) turn off the machine corresponding to the address such that the time the machine is turned on is the same as the jog duration period despite delay introduced by the communications network.

2. The method recited in claim 1 wherein the industrial control system further includes a centralized industrial controller executing a control program and communicating with the communications network to send and receive messages thereon in accordance with the control program.

3. The method of claim 1 wherein the industrial control system further includes multiple distributed industrial controllers executing portions of a control program and communicating with the communications network to send and receive messages thereon in accordance with their portions of the control program.

4. The method recited in claim 1 wherein the output device is incorporated into the machine.

5. The method recited in claim 1 wherein the jog button is a mechanical switch.

6. The method recited in claim 1 wherein the jog button is selected from the group consisting of a capacitive switch and a photoelectric switch.

7. The method recited in claim 1 wherein the jog button is a part of a human-machine interface having a plurality of buttons scanned in sequence.

8. The method as recited in claim 1 wherein the jog duration period is pre-selected by the operator.

9. The method as recited in claim 1, between steps (a) and (b) further comprising the steps of:

receiving the jog message at an industrial controller after being transmitted on the network, the industrial controller executing a stored program to read the jog message at a periodic scan;

analyzing the state of the network to determine whether the machine at the network address can be jogged; and if the machine may be jogged, transmitting the jog message on the network to the output device corresponding to the machine at the network address of the jog message.

10. In an industrial control system, a system for jogging a machine, comprising:

a jog button for receiving input from an operator observing the operation of the machine and initiating a jog message including a jog duration period defining the beginning and ending of jogging the machine and an address indicator corresponding to a network address for the machine;

a communications network for transmitting the jog message from the jog button to the network address of the machine, the network introducing a variable delay in the transmission of messages; and an output device corresponding to the machine at the network address of the jog message connected to the jog button via the communications network, the output device reading the jog message to turn on the machine, wait for a time period equal to the jog duration period and then turn off the machine such that the time the machine is turned on is the same as the jog duration period despite delay introduced by the communications network.

11. The system of claim 10 further comprising a centralized industrial controller executing a control program and communicating with the communications network to send and receive messages thereon in accordance with the control program.

12. The system of claim 10 further comprising multiple distributed industrial controllers executing portions of a control program and communicating with the communications network to send and receive messages thereon in accordance with their portions of the control program.

13. The system of claim 10 wherein the output device is incorporated into the machine.

14. The system of claim 10 wherein the jog button is a mechanical switch.

15. The system of claim 10 wherein the jog button is selected from the group consisting of a capacitive switch and a photoelectric switch.

16. The system of claim 10 wherein the jog button is a part of a human-machine interface having a plurality of buttons scanned in sequence.

17. The system of claim 10 wherein the jog duration period is pre-selected by the operator.

18. The system of claim 11 further comprising an industrial controller receiving the jog message after being transmitted on the network from the jog button, the industrial controller executing a stored program to:

(a) read the jog message at a periodic scan;

(b) analyze the state of the network to determine whether the machine at the network address can be jogged; and (c) if the machine may be jogged, transmit the jog message on the network to the output device corresponding to the machine at the network address of the jog message.

* * * * *